United States Patent [19]

Hug

[11] 4,312,756
[45] Jan. 26, 1982

[54] APPARATUS FOR THE SEPARATION OF LIQUIDS FROM SUSPENSIONS

[76] Inventor: Franz O. Hug, c/o OFAG Zurich, Dufourstr. 90, 8008 Zurich, Switzerland

[21] Appl. No.: 67,045

[22] Filed: Aug. 16, 1979

[30] Foreign Application Priority Data

Aug. 23, 1978 [DE] Fed. Rep. of Germany ....... 2836866

[51] Int. Cl.$^3$ .............................................. B01D 33/22
[52] U.S. Cl. ................................... 210/330; 210/334; 210/383
[58] Field of Search .................. 210/19, 77, 327, 331, 210/383–385, 388, 785, 332, 334, 407, 413, 415

[56] References Cited

U.S. PATENT DOCUMENTS

| | | | |
|---|---|---|---|
| 2,312,620 | 3/1943 | Bowman | 210/383 |
| 2,932,402 | 4/1960 | Logue et al. | 210/383 |
| 3,157,598 | 11/1964 | Rebiscoul | 210/327 |
| 3,317,050 | 5/1967 | Daman | 210/383 X |
| 3,884,813 | 5/1975 | Donovan et al. | 210/297 |

FOREIGN PATENT DOCUMENTS

1152992 8/1965 Fed. Rep. of Germany .
2251171 5/1974 Fed. Rep. of Germany .
2558683 7/1977 Fed. Rep. of Germany .

*Primary Examiner*—Thomas G. Wyse
*Attorney, Agent, or Firm*—Yount & Tarolli

[57] ABSTRACT

In process for the separation of liquids from suspensions by means of at least one filter layer, on one side of which a suspension is fed and solids accumulate, and on the other side of which separated liquid is carried away, there is given an improved clearing of the feed side filter surface (ZFF) and thus a lengthened operation time until maintenance of the filter layer, through a flow movement ($P_1$, $P_2$) in the suspension chamber (SPR) with movement components oscillating in the normal direction in relation to the filter surface (ZFF), preferably through a suspension flow oscillating between filter surfaces (ZFF) lying opposite each other. An apparatus for the separation of liquids from suspensions makes possible such an improved operation through the suspension-drive device ($AV_1$) with a plurality of surface elements ($FE_1$, $FE_2$) in the direction of movement and which can be flowed around transversely thereto (FIG. 5).

13 Claims, 12 Drawing Figures

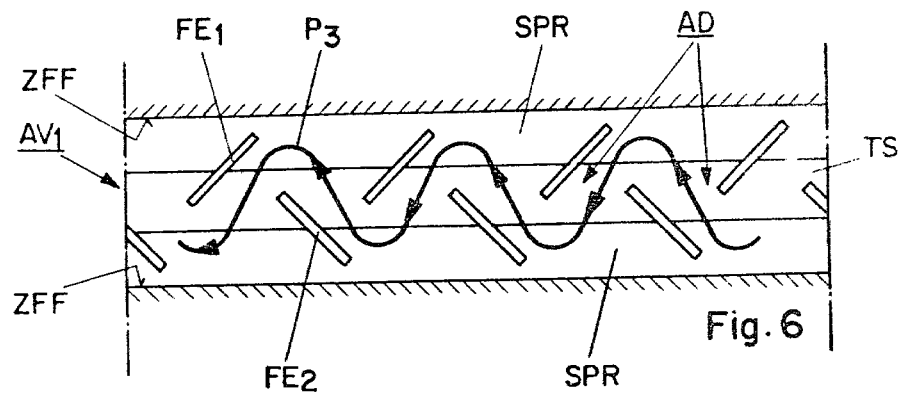
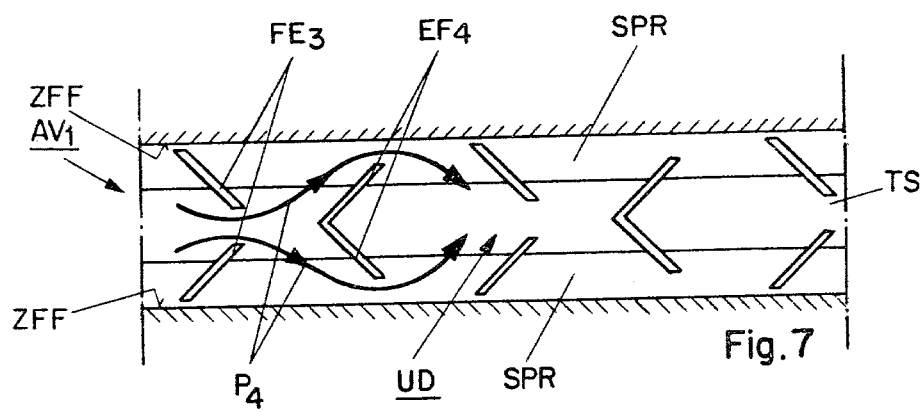
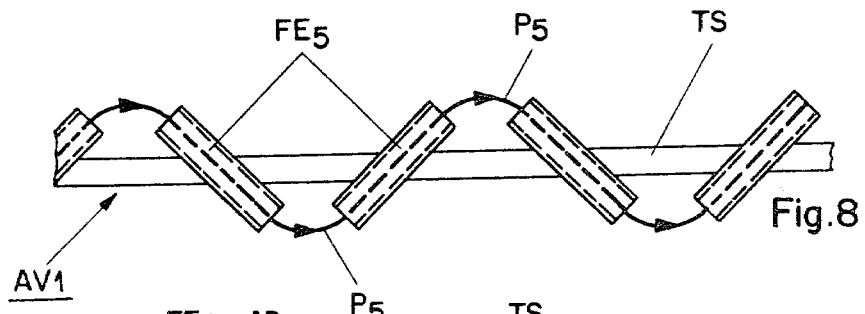
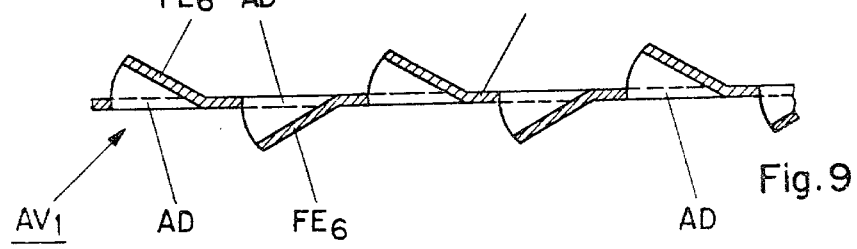

APPARATUS FOR THE SEPARATION OF LIQUIDS FROM SUSPENSIONS

BACKGROUND AND SUMMARY OF THE INVENTION

The invention concerns a process for the separation of liquids from suspensions, in which suspension is fed on one side of at least one filter layer, and liquid separated from the suspension is carried away on the other side of this filter layer, and in which the amount of solids accumulating on the feed side of the filter layer through this separation of liquid, is mixed, through a relative movement between the filter layer and the suspension fed, with the latter, and at least partly carried away. The invention concerns, further, an apparatus for the separation of liquids from suspensions, with at least one filter layer, on the feed side filter surface of which is arranged a suspension chamber connected with a suspension feed and suspension and solids removal means, and on the removal side surface of which is arranged a filtrate chamber which receives the liquid passing through the filter layer, while in the suspension chamber, adjacent the filter surface, at least one drive device movable in relation to the filter surface, is provided.

A process and an apparatus of the said kind are known from German Disclosure No. 2,251,171. This filter apparatus is built up with a plurality of disc-form, coaxially arranged filter elements, of which the surfaces are provided with filter layers. Between two neighboring elements or filter surfaces, as the case may be, there is formed, in each case, a flat cylindrical section of the suspension chamber connected with a suspension feed, while in each of these suspension chamber sections there is arranged for the production of a flow of suspension, a drive device, also disc-form, a so-called disc agitator. The disc-form drive devices of all the suspension sections are also arranged coaxially on a shaft and are set in rotation by the latter. The disc-form drive devices divide the suspension chamber section, in each case, into two chambers, which are bounded, on the one hand, by the filter surface and on the other by the rotating discs of the drive device. Suspension flows axially, as a whole, through the suspension chamber, this movement taking place, within the individual suspension space chambers, substantially radially, outward and inward. Axial passages are situated only, on the one hand, at the circumference of the drive shaft; that is, in the central zone of the disc-form filter elements, and on the other hand, on the outer circumference of the disc-form drive devices. The flow of suspension, directed, respectively, inward and outward, may be set in turbulence by stays (bars, strips) arranged axially or inclined or in the manner of turbine blades, on the discs, and directed against the filter surfaces.

It has proved that in these known filter devices and their process of operation, with only turbulent flow of suspension, which may have additionally a component directed constantly against the filter surfaces, sufficiently high shear tensions within the flowing suspension in the zone next to the filter surface are difficult to obtain in such degree as would be necessary for keeping the filter surfaces free, in the long run, of accumulating solids, and thus for uninterrupted operation for long periods with high efficiency. Rather, in the known apparatus, cleaning and maintenance work would have to be carried out at relatively short intervals, which lead to a relatively low utilization of the machine, and because of the necessary dismantling of the filter device, associated with high operation cost.

The object of the invention, therefore, is to provide a filtration process and a corresponding apparatus, which is distinguished by improved clearing of the filter surfaces under the action of the suspension flow, and thus by a relatively high degree of utilization and low maintenance cost. The accomplishment of the object in accordance with the invention is defined by the claims.

An important feature of the process according to the invention, therefore, is an oscillating flow movement in the direction normal to the filter surface, by which, according to experience, an intensive mixing of the solids settling during the separation of liquid, with the flowing suspension, and thus a cleaning or keeping free of the active filter surface, is attained. It has proved especially effective, to produce a flow movement of the said kind, within the suspension, in a suspension chamber situated between two filter surfaces opposite each other, with an oscillating movement component between the filter surfaces. Through the alternate arrival and turning of the suspension mass against the filter surface, the movement energy of the flow is used especially effectively for freeing the filter surfaces. With this, there is given, preferably, a progressive flow movement of the suspension through the filter surface, in waves, in relation to the movement components oscillating in the direction normal to the filter, so that the whole expanse of the generally circular filter surface is uniformly included. Additionally, intensified eddy components may be produced within the suspension flow, which is important, above all, for the avoidance of solids precipitation in the zone of the thickened suspension.

The apparatus in accordance with the invention is distinguished by a turning of the suspension flow in the sense of an oscillating normal movement toward the filter surface, and namely, with the aid of surface elements arranged in succession in the direction of movement which have different distances and/or setting angles in relation to the filter surface. In this way, a dynamic pumping effect with strong normal components toward the filter surface is produced, but with an alternating opposite direction of this pumping effect in the successive surface elements of the drive device. Hence, the alternate suction and pressure effect on the solids settling in the zone of the filter surface leads to an especially effective loosening, detaching and carrying away of the solids, that is, to a highly effective clearing of the filter surfaces. This forced turning, which takes place with the aid of suitably arranged surface elements, is combined to particular advantage with the above-mentioned arrangement of passages between the surface elements. In this way there is given greater amplitude of oscillation and an intensified formation of eddies within the suspension flow.

DETAILED DESCRIPTION OF THE DRAWINGS

The invention will be further explained with reference to the examples of execution shown schematically in the drawings. In these:

Figure 10:
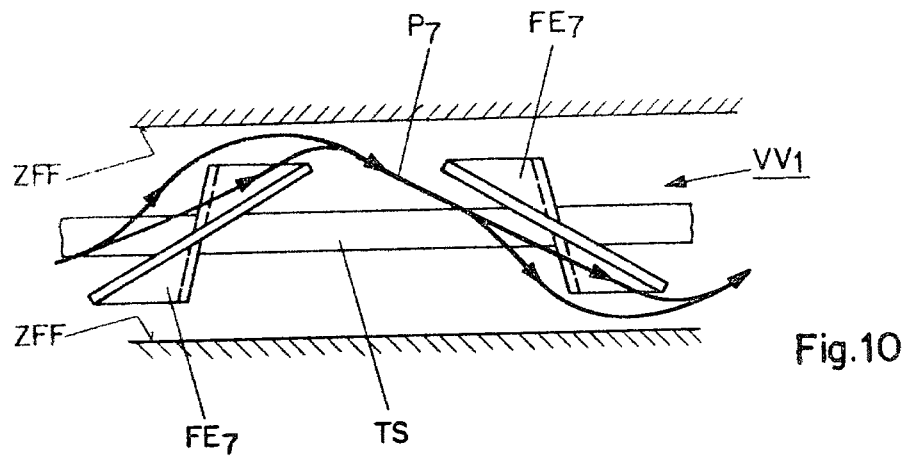
Figure 11:
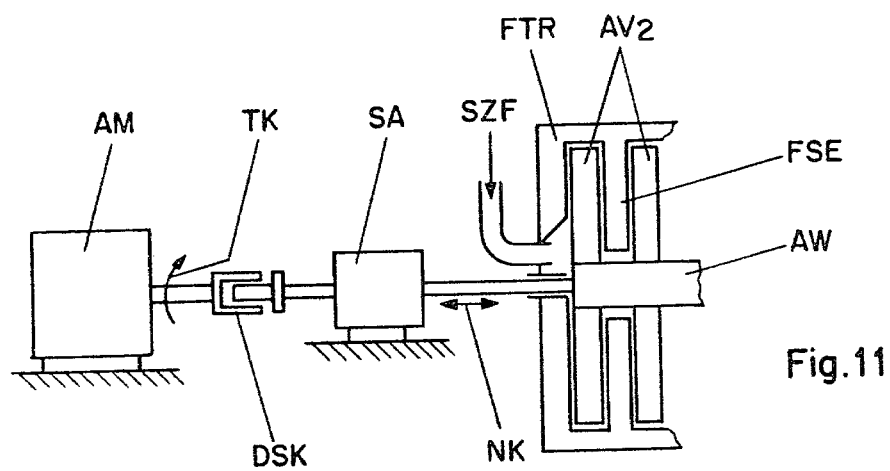
Figure 12:
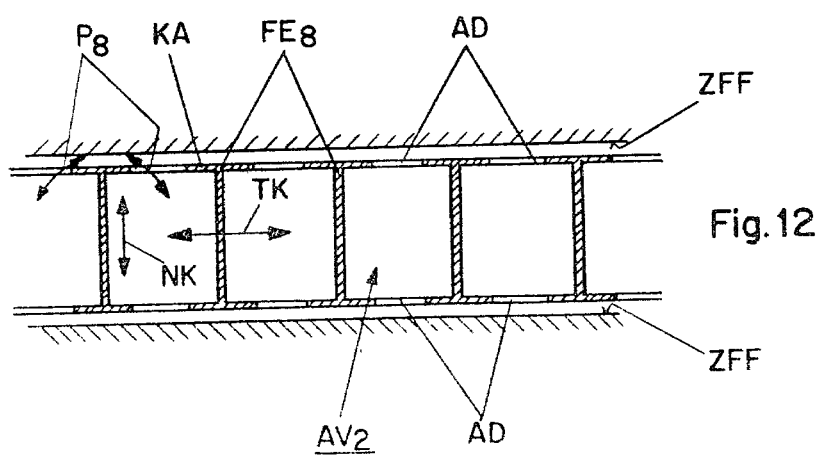

FIGS. 3-10 show in partial axial section, various executions of rotating drive devices with surface elements designed by way of example, for the turning of flow, in schematic representation of the cycle; while FIG. 11 shows the basic structure of a vibration flow drive with oscillating suspension flow, in the form of a block scheme with a schematic partial axial section of the filter, and FIG. 12 shows a schematic development of a rotating and vibrating drive device, from the apparatus according to FIG. 11.

DESCRIPTION OF PREFERRED EMBODIMENT

Figure 1:
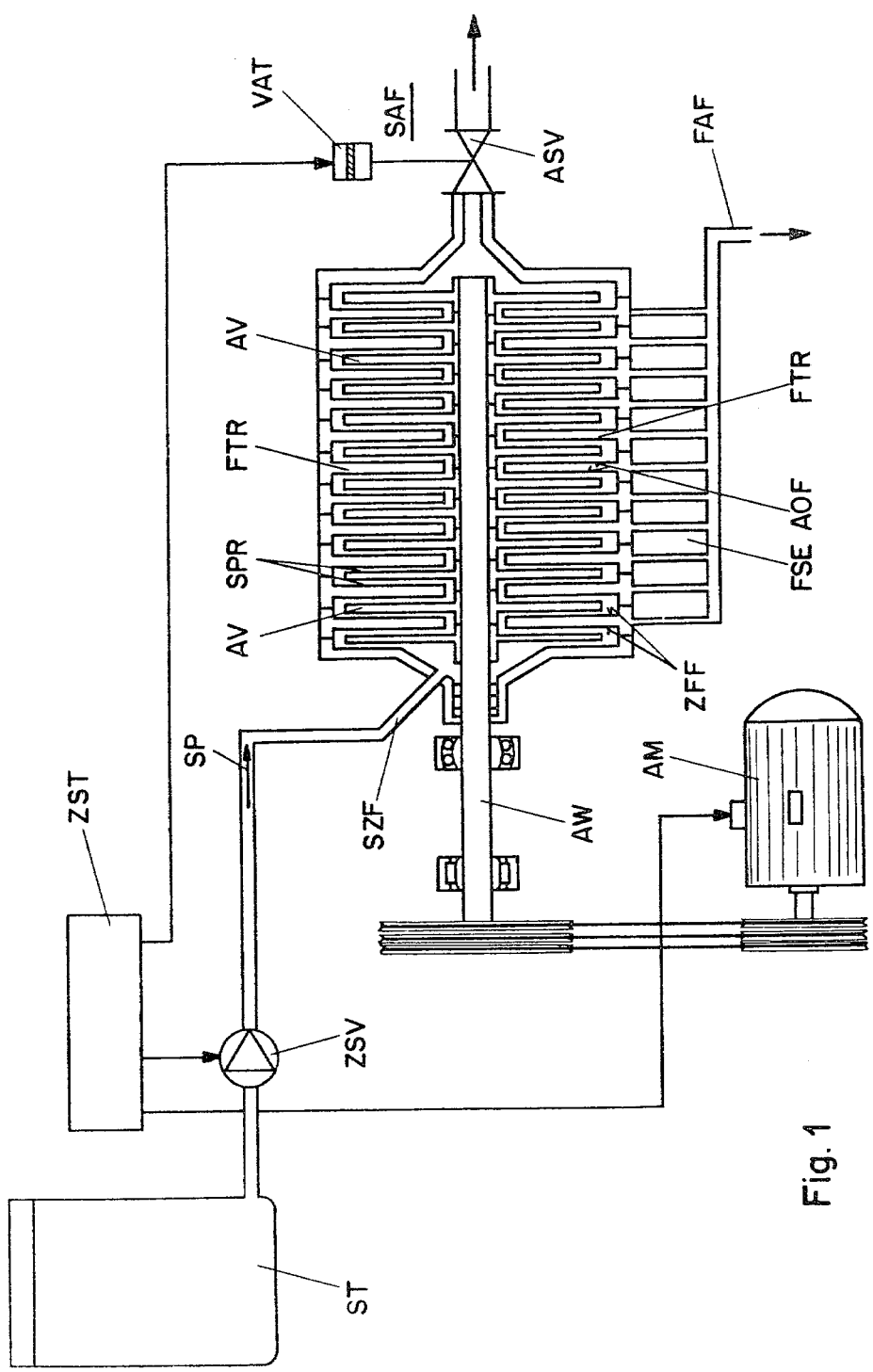
FIG. 1 shows a block scheme of a suspension filtering unit with a multiple disc filter arrangement and rotating flow drive device, in axial section.

In the unit represented in FIG. 1, a suspension SP is fed from a tank ST through a feed control valve ZSV, to a filter machine, which is designed as a multiple coaxial disc filter, with suspension feed SZF, filtrate exit FAF, as well as suspension and solids exit SAF. The filter machine itself consists of the coaxially assembled disc-form filter elements FSE, which have, in each case, two feed side filter surfaces ZFF, arranged axially opposite each other. Two neighboring filter elements form between their filter surfaces ZFF opposite each other, a suspension chamber, which is divided, through a flow drive device AV, also disc-form as a whole, projecting radially inward, into two suspension chambers SPR. All the disc-form drive devices are fastened coaxially on a drive shaft AW, which is driven by a motor AM.

In the suspension chambers SPR, the suspension comes in contact with the filter surfaces ZFF and the solids deposited on them, while under the action of the drive devices and the flow movement produced by them, there is an intensive mixing of the suspension feed on the solids, so that the latter are carried away with the suspension flow. The liquid passing through the filter layers and thus separated from the suspension, the so-called filtrate, accumulates in the filtrate chambers FTR on the removal side surfaces AOF of the filter layers, and runs through connection pipes for the individual filter elements FSE to the filtrate drain FAF. The suspension, enriched in solids, flows over the filter surface ZFF and is drawn off through a removal control valve ASV. The suspension and solids exit SAF includes also a valve drive VAT for the removal control valve ASV, which is connected, together with the feed control valve ZSV and the drive motor AM to a central control ZST. The latter adapts the feeding of suspension and the removal of suspension and solids to each other, taking into account the speed of the drive devices, and thus the speed of suspension flow at the filter surface ZFF so that sufficiently thin fluid is retained for the continuous drawing off of the thickened suspension and/or the rinsing out of the solids deposited. The rinsing effect is dependent on the feed side filter surfaces ZFF and thus on their keeping free, in the long run, from settling solids from the flow movement within the suspension chambers.

Figure 2:
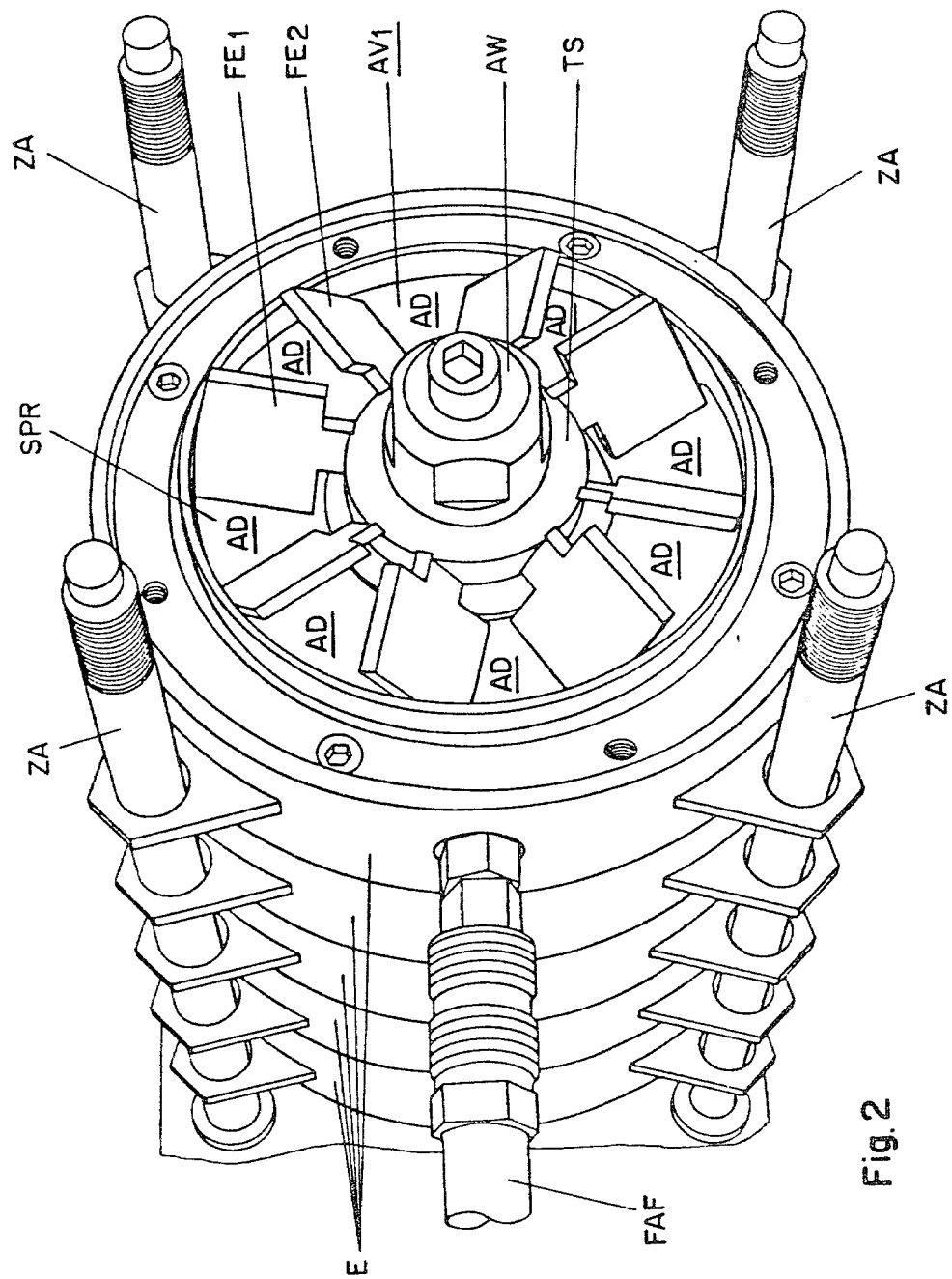
FIG. 2 is a perspective representation of a part of the filtering apparatus according to FIG. 1.

FIG. 2 gives a look into a suspension space chamber with a flow drive device or suspension agitating device $AV_1$ and suspension chambers on both sides SPR in the zone of a disc-form filter element FSE. The whole of the filter elements FSE is held together coaxially by means of tension anchors ZA. The cylindrical arrangement of the filter elements, given in this way, is passed through, centrally, by the drive shaft AW, on which sit the disc or hub-shaped bearing elements TS of the drive devices or suspension agitating devices $AV_1$, with drive surface elements $FE_1$ and $FE_2$, placed opposite the peripheral direction of movement. Between the neighboring surface elements $FE_1$ and $FE_2$, there is situated, in each case, an axial passage AD, so that, as will be represented later in more detail, within the suspension chambers there is a peripheral wavy flow, that is, oscillating in the axial direction.

Figure 3:
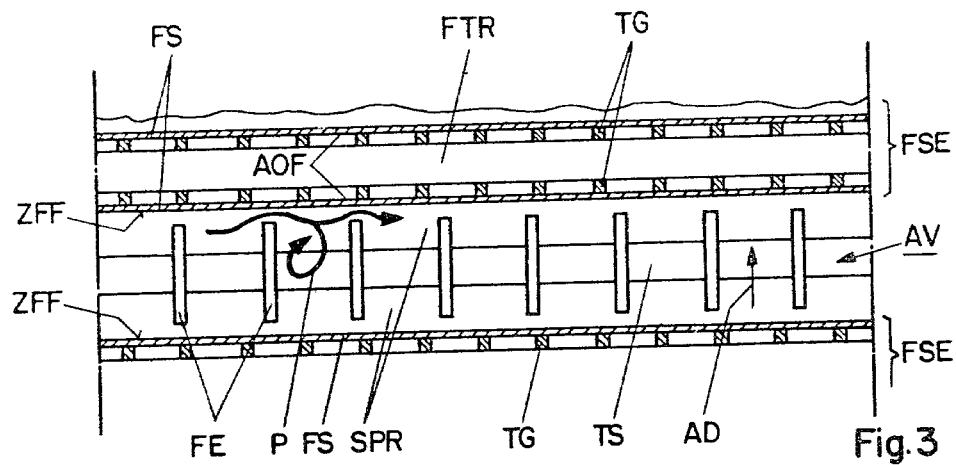

FIG. 3 shows, in a schematic development, a flow drive device or suspension agitating device AV within the suspension chambers SPR, which lie between filter surfaces ZFF opposite each other. These filter surfaces belong to filter elements FSE, lying side by side, of which each includes two filter layers FS with the respective bearing frames TG. The inner, removal side surfaces AOF, of the filter layers FS of a filter element, limit, in each case, a filtrate chamber FTR, which is connected in a manner not shown in detail, with the filtrate collection line.

Important to the design according to FIG. 3 is the use of axially directed, and thus, not turned, drive surface elements FE, which are moved, through the disc or hub-form bearing elements TS (appearing stretched in the circumferential direction in the development), for example, in the representation chosen, from right to left through the suspension. The latter is partly carried along or accelerated by the surface element arrangement; on the other hand, it describes a lagging relative movement in relation to the surface elements under the action of friction and inertia forces. This relative flow of the suspension in relation to the drive device is indicated schematically by the arrows marked P. In this way, pronounced eddies are given which, as a result of forcibly occurring instabilities, also contain oscillations in the axial direction or in the normal direction toward the neighboring filter surface ZFF, in the zone of the axial passages AD between the successive surface elements FE.

Figure 4:
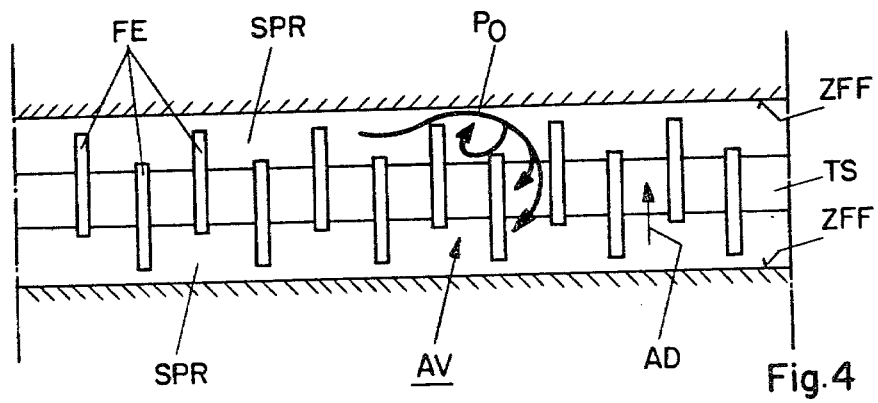

The axially oscillating components of the flow eddies in the suspension chambers may be intensified by an alternating axially displaced arrangement of drive surface elements FE (again, not turned), in the manner of FIG. 4. The relative flow $P_o$ in relation to the drive device or suspension agitating device AV is shown here also by schematic arrow representation.

Figure 5:
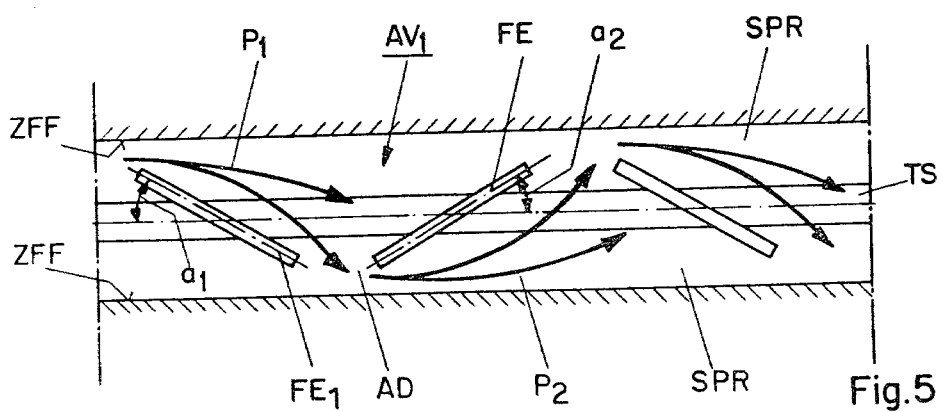

FIG. 5 shows a drive device or suspension agitating device $AV_1$, with the drive surface elements $FE_1$ and $FE_2$, sitting on a bearing element TS, which are turned at oppositely opened angles $a_1$ and $a_2$, in relation to the direction of movement, and give a dynamic pumping effect in the suspension with normal components toward the filter surfaces ZFF. This pumping effect has opposite directions in the successive surface elements, so that a successive suction and pressure effect is given in all zones of the filter surfaces. The intensive development of this wavy progressive oscillation of flow over the filter surfaces is made possible through the axial passages AD between the surface elements $FE_1$ and $FE_2$. The relative flow in relation to the drive device is indicated in the zone of the surface elements $FE_1$ and $FE_2$ by $P_1$ and $P_2$, respectively, and schematically by the arrows system. The wave-form axial and peripheral oscillation may be strengthened in its intensity still more by additional axial displacement of the successive drive surface elements $FE_1$ and $FE_2$, in the manner of FIG. 6. The relative flow $P_3$ is indicated for simplicity, as a wave form running through the arrangement of surface elements; actually, it is full of intensive eddies, which have an advantageous additional effect in keeping the filter surfaces clear. An especially high speed flow of the suspension, both normal and tangent to the filter surfaces ZFF, and thus also an intensive dynamic clearing of the latter, is given, on the other hand, with a surface element arrangement according to FIG. 7, with relative flow P4. The latter is produced with the aid of surface elements FE3 and FE4, arranged substantially aligned axially, which form successive pairs in the circumferential direction, with oppositely opened setting angles, thus arranged in wedge form. In the zone of the pairs of surface elements FE3, diverging, in each case, in the direction of movement, passages UD, directed in the circumferential direction are placed, which are important for the development of the axially converging flow sections and thus for the subsequent division and turning of the flow in the direction toward the filter surfaces.

FIG. 8 shows a modification of a drive device or suspension agitating device AV1 with tubular drive surface elements FE5, arranged inclined in relation to the peripheral direction of movement, which are suitable with an alternate opposite setting, especially for an oscillating suspension flow P5 lying between opposite filter surfaces (not shown here).

A design especially favorable to production, of a drive device or suspension agitating device AV1 with surface elements FE6, alternately set opposite, is indicated in FIG. 9. According to this, the surface elements are designed coherently in one piece, over a part of their surface outline, with the material of a disc-form bearing element. This construction makes possible a cost-favorable production from a bearing disc through relatively simple stamping and pressing work steps. There is given here the especially simple possibility of forming through release, when the surface elements have an outline form corresponding at least partly to the respective axial passages AD of the bearing elements TS.

An especially favorable design in FIG. 10 of a drive device or suspension agitating device AV1, as to drive efficient and uniform flow speed normal to the filter surface, with surface elements FE7, set opposite, is given by propeller-like twisting, with setting increasing steeply radially inward. The suspension flow P7 indicated, taking into account the different circumferential speed in the different radial zones, gives the uniform normal flow, desired here, of the different zones of the filter surfaces ZFF.

The suspension flow, oscillating in the direction normal to the filter surfaces, may also be attained with the aid of suitably swinging surface element arrangements or drive devices. Such an arrangement, in which an overlapping of normal and tangential components, NK and TK, respectively, of the movement of the drive devices or suspension agitating devices AV2 in relation to the disc-form filter elements FSE is provided in an arrangement similar to FIG. 1, is found in the representation according to FIG. 11. Here, there is inserted between the drive motor AM and the drive shaft AW of the drive devices or suspension agitating devices AV2, a coupling DSK, secure against rotation but movable axially, so that with the aid of a swinging drive SA, acting axially, the axial oscillation of the drive shaft and thus of the drive devices can be produced, while the rotation with tangential movement in relation to the filter surfaces proceeds according to the construction previously explained.

An oscillating tangential movement of the drive devices in relation to the filter surfaces may also be provided, if desired, as indicated in FIG. 12 for an arrangement of chamber-type drive-surface elements FE8 with axial passages AD for the tangential components TK. An intensive suspension flow P8 is given, with oscillating components normal to the filter surfaces ZFF, especially in the T-form head section KA of the surface element, while the compressed amount of suspension in the axial passages AD can escape. The stroke of the normally oscillating components NK of the drive movement is naturally to be limited according to the distance of the filter surfaces ZFF.

What is claimed is:

1. Apparatus for separating liquids from suspensions, comprising at least one suspension chamber arranged between two filter layers having substantially planar feed side filter surfaces arranged at least in part parallel to and opposite each other, said suspension chamber being connected with a suspension feed and a suspension and solid removal, and in said suspension chamber in the range of said filter surfaces there being at least one suspension agitating device rotating in a plane at least approximately parallel with said filter surfaces and having at least one circumferential series of surface elements arranged in circumferential succession in the direction of movement of the agitating device, said surface elements being arranged at an angle to the filter surfaces with axial passages between said surface elements for causing an oscillating suspension flow movement component between said opposite filter surfaces from one side filter surface to the opposite side filter surface, said surface elements, of the agitating device being arranged at angles at least in part different from each other in relation to the filter surfaces and/or with the distances from said filter surfaces at least in part different from each other.

2. Apparatus, as set forth in claim 1, with said suspension chamber, filter layers, filter surfaces and said suspension agitating device being generally annular and coaxial; said device rotatable about said axis and having surface elements approximately coextensive with said feed side filter surfaces.

3. Apparatus for separating liquid from a suspension of solids and liquid, comprising at least one suspension chamber defined by and located between two filter layers having substantially planar feed side filter surfaces arranged at least in part parallel to and opposite each other, said suspension chamber being connected with a suspension feed for directing a suspension into said suspension chamber and with a suspension and solids removal for directing suspension and solids from said suspension chamber, means for directing liquid which flows through said filter surfaces away from said filter layers, and means in said suspension chamber in the range of said filter surfaces for causing an oscillating suspension flow movement component between said opposite filter surfaces from one side filter surface to the opposite side filter surface, said means comprising at least one suspension agitating device rotating in a direction and in a plane at least approximately parallel with said filter surfaces and having at least one circumferential series of elements arranged in circumferential succession in the direction of rotation of the agitating device, said elements having surfaces which are arranged at an angle to said filter surfaces and extend transverse thereto, said surfaces defining axial flow passages between said surface elements for directing said oscillating flow movement component against said opposite filter surfaces.

4. Apparatus as set forth in claim 3, further comprising each of said suspension chambers, side filter surfaces and said suspension agitating device being generally annular, coaxial, approximately coextensive and having generally circular and coaxial inner or outer outlines, said one suspension agitating device and circumferential series of elements being rotatable on an axis located generally coaxially with the centers of said circular outlines.

5. Apparatus for the separation of liquids from suspensions, with at least one filter layer on the feed side filter surface of which is arranged a suspension chamber, connected by suspension flow with a suspension feed and a suspension and solids removal, and on the exit side surface of which is arranged a filtrate chamber, which receives the liquid passing through the filter layer, with the distinction that in the suspension chamber in the zone of the filter surface there is provided means for moving the suspension flow by oscillation toward and away from the feed side filter surface and by progression over the feed side filter surface for loosening, detaching and carrying away solids from the feed side filter surface by the suspension flow to provide a feed side filter surface cleaning effect by the movement energy of the suspension flow, said means including at least one suspension agitating device movable relative to the filter surface and having a plurality of surface elements arranged in succession in the direction of movement and having surfaces at angles to the filter surface for moving the suspension flow toward, away from and over the feed side filter surface during the movement of said suspension agitating device for loosening, detaching and carrying away solids therefrom by the suspension flow, said means including said suspension agitating device rotatable in a plane at least approximately parallel with the filter surface and having at least one circumferential series of surface elements arranged in succession in the direction of movement with axial flow passages therebetween.

6. Apparatus according to claim 5, with the distinction that
said means including the suspension agitating device having at least two surface elements, arranged on a bearing element in succession in the direction of movement and having opposite opening angles of setting in relation to the adjacent filter surface.

7. Apparatus according to claim 6, with the distinction that
said means including on the bearing element, surface elements in succession in the circumferential direction arranged axially staggered in relation to each other.

8. Apparatus according to claim 6, with the distinction that
said means including that on the bearing element are provided in the circumferential direction successive pairs of surface elements with the elements in each pair located substantially opposite each other in the axial direction; that the pairs of surface elements, succeeding each other in the circumferential direction, have, in relation to the direction of movement, alternately oppositely opened setting angles; and that, in each case, in the zone of the pair of surface elements diverging in the direction of movement, a circumferential passage is provided for the oscillating suspension flow.

9. Apparatus according to claim 6, with the distinction that
said means including on the bearing element, in succession in the circumferential direction, tubular surface elements, arranged inclined in relation to the direction of movement.

10. Apparatus according to claim 6, with the distinction that
said means including on the bearing element propeller-like wound surface elements.

11. Apparatus according to claim 6, 7 or 8, with the distinction that
said means including the surface elements having a part of their surface outline forms integral with a disc portion of said bearing element.

12. Apparatus according to claim 11, with the distinction that
said means including the surface elements having an outline form corresponding, at least approximately, to respective axial passages carried by the bearing element.

13. Apparatus according to claim 5, 6, 7, 8, 9, or 10, with the distinction that, between two feed side filter surfaces lying opposite each other,
said means including at least one suspension agitating device arranged with flow passages transverse to its direction of movement so that oscillating suspension flow can move from one filter surface to the opposite filter surface.

* * * * *